United States Patent
Barcelo Llado et al.

(10) Patent No.: US 12,284,110 B1
(45) Date of Patent: Apr. 22, 2025

(54) NETWORK TRAFFIC MANAGEMENT

(71) Applicant: Amazon Technologies, Inc., Seattle, WA (US)

(72) Inventors: Joan Barcelo Llado, Zetland (AU); Eric Charles Briffa, Kogarah (AU); Bobby Brown, Sydney (AU); Kenan Yang, Chatswood (AU); Seyed Arash Sadrieh, Breakfast Point (AU); Tahir Azim, Artarmon (AU); Julien Ridoux, Seattle, WA (US); Harvo Reyzell Jones, Gig Harbor, WA (US); Thomas Bradley Scholl, Seattle, WA (US); Ali Khayam, San Jose, CA (US); Robert Louis Mosher, Rockwell, NC (US); Michael W. Palladino, Renton, WA (US); Rajat Chaudhary, Seattle, WA (US); Nikhil Ashok Arjunagi, Chatswood (AU); Fiachra John Groarke, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,531

(22) Filed: Jun. 29, 2022

(51) Int. Cl.
*H04L 45/12* (2022.01)
*H04L 43/087* (2022.01)
(Continued)

(52) U.S. Cl.
CPC .......... *H04L 45/123* (2013.01); *H04L 43/087* (2013.01); *H04L 43/0888* (2013.01); *H04L 45/121* (2013.01); *H04L 47/125* (2013.01)

(58) Field of Classification Search
CPC . H04L 45/123; H04L 43/087; H04L 43/0888; H04L 45/121; H04L 47/125
See application file for complete search history.

(56) References Cited

U.S. PATENT DOCUMENTS 10,608,942 B1 * 3/2020 Shaikh ................. H04L 47/125
2002/0120766 A1 * 8/2002 Okajima .................. H04L 9/40
709/223

(Continued)

FOREIGN PATENT DOCUMENTS

EP        1898572 A1 * 3/2008 ............. H04L 45/04

OTHER PUBLICATIONS

P. N. Tran and N. Boukhatem, "An utility-based interface selection scheme for multi-homed mobile terminals," 2009 IEEE 20th International Symposium on Personal, Indoor and Mobile Radio Communications, Tokyo, Japan, 2009, pp. 767-772 (Year: 2009).*

(Continued)

*Primary Examiner* — Messeret F Gebre
(74) *Attorney, Agent, or Firm* — Klarquist Sparkman, LLP

(57) ABSTRACT

Technologies are disclosed for performing context-aware routing of traffic based on an application of a series of filters and/or selectors to determine an optimal group of interfaces for servicing traffic relating to a prefix. A traffic management control plane processes input data corresponding to aggregated telemetry data for a network by determining candidate groups of interfaces to service a network prefix and applies tunable filters and/or selectors to the candidate groups to determine a targeted group to use for servicing traffic corresponding to the prefix. The determined targeted group is mapped to the prefix in a mapping result, which is then provided to an actuator interface to control network devices to inject the new mapping into the network to control traffic according to the mapping.

19 Claims, 7 Drawing Sheets

(51) Int. Cl.
*H04L 43/0888* (2022.01)
*H04L 45/121* (2022.01)
*H04L 47/125* (2022.01)

(56) References Cited

U.S. PATENT DOCUMENTS

| | | | | |
|---|---|---|---|---|
| 2004/0009751 | A1* | 1/2004 | Michaelis | H04W 88/06 |
| | | | | 455/434 |
| 2014/0122683 | A1* | 5/2014 | Zhao | H04L 41/12 |
| | | | | 709/223 |
| 2016/0248657 | A1* | 8/2016 | Kasiviswanathan | H04L 45/02 |
| 2020/0014615 | A1* | 1/2020 | Michael | H04L 45/24 |
| 2022/0278921 | A1* | 9/2022 | Singh | H04L 45/123 |
| 2023/0017692 | A1* | 1/2023 | Kommula | H04L 45/42 |

OTHER PUBLICATIONS

Quoc-Thinh Nguyen-Vuong, Agoulmine, N., & Ghamri-Doudane, Y. (2008). A user-centric and context-aware solution to interface management and access network selection in heterogeneous wireless environments. Computer Networks, 52(18), 3358-72. (Year: 2008).*

B. Nour, H. Khelifi, R. Hussain, H. Moungla and S. H. Bouk, "A Collaborative Multi-Metric Interface Ranking Scheme for Named Data Networks," 2020 International Wireless Communications and Mobile Computing (IWCMC), Limassol, Cyprus, 2020, pp. 2088-2093, doi: 10.1109/IWCMC48107.2020.9148196. (Year: 2020).*

* cited by examiner

NETWORK TRAFFIC MANAGEMENT

BACKGROUND

Generally described, communication networks transmit information from one location to another through routing devices. These routing devices employ routing protocols when transmitting data from one point to another. For example, a group of routing devices may use a common routing protocol to exchange routing information, such as the connectivity between different routing devices or the number of routing devices in a given routing path. The routing devices then use this routing information to determine what path should be used in transmitting data from one location to another, i.e., what routing devices should be used.

Routing protocols include interior gateway protocols or "IGPs" as well as exterior gateway protocols or "EGPs." IGPs include the Open Shortest Path First ("OSPF") and Intermediate System to Intermediate System ("IS-IS") protocols. One exemplary EGP is the Border Gateway Protocol ("BGP"). IGPs often are used to communicate within a grouping of routing devices, such as an autonomous system ("AS"). EGPs often are used to communicate between different groupings of routing devices, such as multiple different autonomous systems.

Transmission of data from one location to another may involve a number of different routing devices and a number of different routing protocols. For example, data may pass through several routing devices that communicate over a first OSPF network within a first AS and then through several other routing devices that communicate over a second OSPF network within a second AS. In this scenario, the first and second AS may communicate with each other using BGP over the Internet. At an edge of the AS, a border network is used to connect the AS to the Internet and typically uses third-party routers coupled to routers of, for example, a cloud provider or other network owner. Updating routing tables in the border network has added complications due to the connection to third-party routers that are not within the cloud provider or other network owner and due to competing considerations for selection of best paths through the network.

DETAILED DESCRIPTION

Communication between different autonomous systems is accomplished in a border network. Typically, border networks are configured to be reactionary to network events. For example, routers in the border network can transmit alerts (e.g., capacity or latency) to a control plane that receives the alerts and provides corrective action, such as having a network administrator attend to the router. However, waiting for an alert to occur typically means that packets have already been lost and will continue to be lost until the correction is made. Rather than wait for alerts to occur, a traffic management control plane can analyze network information and apply a series of tunable filters and/or selectors corresponding to various combinations of parameters, such as a price associated with transmission over third-party routers, a capacity of the border routers, performance information (e.g., latency, etc.) of the border routers, and/or other characteristics. Using these filters, groups of interfaces may be mapped to prefixes for traffic in order to provide context-aware routing of the traffic. By continuously updating the mapping of prefixes to interface groups based on the application of the tunable filters/selectors, potential problems can be corrected before occurring and desired attributes for the handling of traffic may be maintained.

Thus, the system described augments a control plane provided by BGP with Availability, Performance and Cost (APC) telemetry collected from existing services in a cloud environment. Such telemetry can be continuously correlated in a convex optimization framework to maintain the network in its optimal state. Other optimizations can also be used, such as a non-convex optimization, machine learning, constraint programming and heuristics. As a result, the framework can proactively avoid potential network degradation events (e.g. congestion or performance impairments) and the resulting user impact, while reducing the cost of routing traffic through upstream peers/transits.

Figure 1:
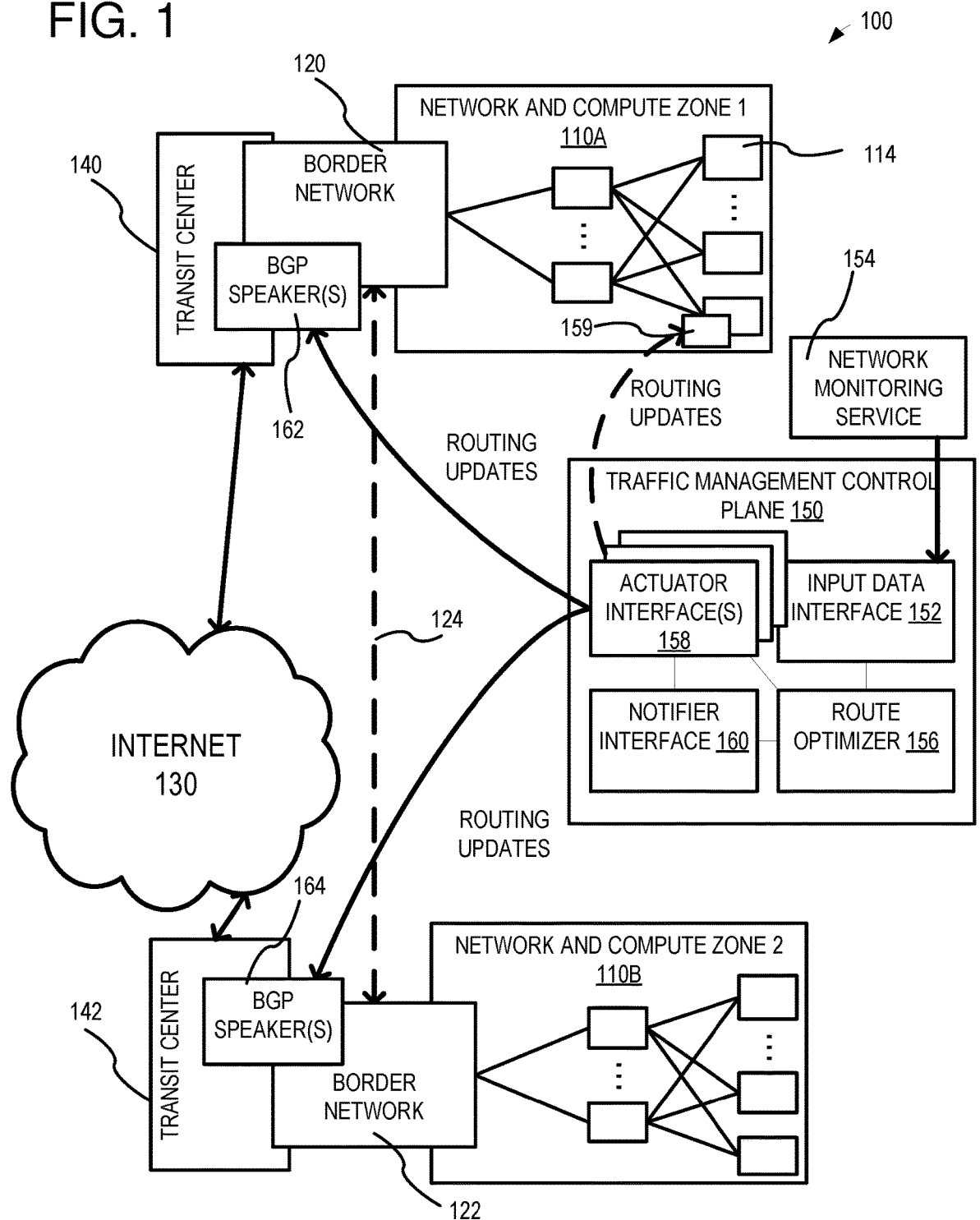
FIG. 1 is an example system including multiple autonomous systems coupled together through the Internet, with a traffic management control plane for updating prefix mappings within a border network using a series of tunable filters and/or selectors.

FIG. 1 is an exemplary system diagram illustrating a system 100 for managing traffic routing in a border network. The system 100 includes a plurality of network and compute zones 110A-110B coupled together. Although only two network and compute zones 110A-110B are shown, there are typically many additional network and compute zones coupled together to form a network. Additionally, although not shown, there may be intermediate network devices between the network and compute zones 110. In any of the examples described herein, a network and compute zone can be a group of networked computing devices (such as routers) that can be identified as an origin for one or more network address prefixes and/or other networking equipment and servers (e.g., data center infrastructure, edge devices, etc.). As an origin for a network address prefix, a network and compute zone and/or one or more network devices therein can be regarded by routers in the network as an ultimate destination for data packets destined for network addresses that begin with the network address prefix. Example network address prefixes include IP address prefixes, routing masks, subnet masks, etc. Example network and compute zones include separate availability zones, data centers, subnets, border gateway protocol (BGP) autonomous systems, etc. In practice, any group of networked computing devices that can be identified as a destination for a given network address prefix can be and/or can be included in a network and compute zone. One or more computing devices in a network and compute zone can generate routing protocol messages that are transmitted through a computer network and/or between computer networks. The generated routing protocol messages can identify routes through the computer network that can be used by routers in the network to transmit data packets towards computing devices in the network and compute zone. In some examples, the computing devices within the network and compute zone all have a same policy applied by an administrator of the network and compute zone. An example computing device is shown at 114 and can be coupled to a network within the network and compute zone 110, such as a Clos network.

Each network and compute zone 110A-B includes a border network 120, 122. The border networks 120, 122 can be coupled together as shown at 124. In any of the examples described herein, a border network 120, 122 includes multiple routers configured to provide a point of entry for a given network and compute zone. Such routers in the border network are sometimes called edge routers. Thus, for example, an edge router is an Internet Protocol (IP) router that forwards packets between autonomous systems using BGP. In some examples, the border network allows a cloud provider Autonomous System (AS) to connected with another AS through an Internet network (e.g., Internet 130). The border network 120, 122 can be configured to route data packets received from computing devices external to the network and compute zone to computing devices within the network and compute zone. The border network 120, 122 can also be configured to route data packets received from computing devices internal to the network and compute zone to computing devices external to the network and compute zone, such as through the Internet 130. A router that is external to the network and compute zone can be referred to as a non-zone router. An edge router can be configured to transmit route advertisement messages (such as BGP UPDATE messages, or the like) to external routers that identify network address prefixes for which the edge router can act as a next hop in the routing of data transmissions.

Routers of the border networks 120, 122 can be housed in transit centers 140, 142 and can be configured to route traffic based on updates transmitted via associated BGP speakers 162,164, as described in more detail below. The transit centers 140, 142 can be physical buildings that allow third-party routers to connect to routers of a cloud provider. The transit centers 140, 142 can be coupled together through the Internet 130. The third-party routers can include a variety of different peering types, including, but not limited to, Private Network Interconnects (PNI), transit providers, and Internet Exchange providers. Third-party routers typically cost money to use and a cloud provider can have contractual arrangements with the third-party providers in order to transmit packets through the third-party routers.

In any of the examples described herein, a network computing device or, more simply, network device is any device that includes input/output ports and is configured to route packets there through. Example network devices include routers, switches, bridges, etc. A router can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

A traffic management control plane 150 can be controlled by the cloud provider and may include a controller programmed to generate egress maps (and, in some examples, ingress maps) to (e.g., indirectly) update routers in the border networks 120, 122. As further described below, the generation of the maps for the border networks 120, 122 can include using a series of filters and/or selectors to determine a group of interfaces to use in the routing of traffic associated with a network prefix. For example, the filters and/or selectors can be used to balance parameters such as performance, price, capacity, and/or other network/device factors for controlling traffic in a context-aware manner.

The traffic management control plane 150 may include an input data interface, configured to receive telemetry data from a network monitoring service 154 relating to (e.g., real-time) network parameters. For example, the network monitoring service 154 may include and/or be connected to a third party that injects packets into the network and performs round trip latency calculations and/or other performance measurements for all (or many) paths in the network. Telemetry data for the network may include a large amount of data that is not directly used by the traffic management control plane, so the network monitoring service 154 and/or the input data interface 152 may include a pre-module (e.g., a data ingestion service) configured to fetch the raw telemetry data and aggregate the fetched data into a compact format including data sets that are configured to work with filters and/or selectors of a route optimizer 156.

Route optimizer 156 is configured to apply models to input data from the input data interface 152 to determine changes to a state of the network in order to perform context-aware traffic management in the network. For example, route optimizer 156 may include a map calculator configured to apply a chain of filters and/or selectors to place all traffic (e.g., all egress traffic) for at least a portion of the network onto a path that balances competing dimensions, such as congestion avoidance, reduction of backbone traffic, peering and transit costs, operator configurations, performance (e.g., latency, etc.), and/or other parameters. Examples of filters and/or selectors are described in more detail below with respect to FIGS. 2 and 3. The chain of filters and/or selectors may be applied to available groups of interfaces (e.g., interfaces of network devices in the network and compute zones 1 and 2 110a/b that can service the traffic, such as when grouped together to form paths through the network) to narrow the groups of interfaces to one group for servicing each network prefix. It is to be understood that a group of interfaces may be used to route traffic for multiple prefixes in some examples. In some examples, each network prefix may be assigned one group of interfaces by the route optimizer 156 each time the optimizer is run for the prefix. In other examples, one or more network prefix may be assigned a plurality of groups of interfaces by the route optimizer 156 when the optimizer is run for the prefix(es). The route optimizer 156 may attempt to allocate prefixes based on size (e.g., a largest prefix first) or other parameter until a queue of prefixes is exhausted (e.g., each prefix in the queue is allocated at least one group of interfaces).

The result of the route optimizer 156 may include one or more mappings indicating pairings of each of the prefixes to a respective group of interfaces. As noted above, it is to be understood that description herein referencing the mapping of a prefix to a respective group of interfaces may also be applicable to examples in which the prefix is mapped to multiple groups of interfaces. The result of the route optimizer 156 may be provided to an entity that adjusts the network (e.g., an actuator interface 158, described in more detail below) and/or an entity that generates metrics (e.g., a simulator that uses the result as feedback for testing adjustments before applying the adjustments to the network). In examples where the result is provided to the actuator interface 158, the actuator interface may be configured to process the mappings to determine which mappings are already implemented and which are changes to a current state of the network. In some examples, the result of the route optimizer 156 may be provided to multiple actuator interfaces, each configured to process the mappings for a respective form of steering mechanism used by one or more network devices. For example, one or more of the actuator interfaces 158 may include a module that translates the changed mappings into Border Gateway Protocol (BGP) actions, which copy BGP information received from the Internet and modify the information to generate BGP messages for propagation to the BGP speakers 162,164. The BGP messages are configured to cause the BGP speakers to inject new routing instructions to the network routers to shift traffic in accordance with the maps output by the route optimizer 156. In other non-limiting examples, one or more of the actuator interfaces 158 may include a module that translates the changed mappings into routing updates usable by a module sitting on a host (an example of which is schematically depicted at 159) that performs encapsulation for tunnel endpoints based on the routing updates. A notifier interface 160 may also receive information from the route optimizer 156 and/or actuator interface 158 and generate corresponding notifications relating to changes made to the network. For example, the notifier interface 160 may interface to other controllers in other networks so that the networks may coordinate with one another through the exchange of data and/or messages (e.g., coordinate with one another based on the output of the route optimizer 156).

Figure 2:
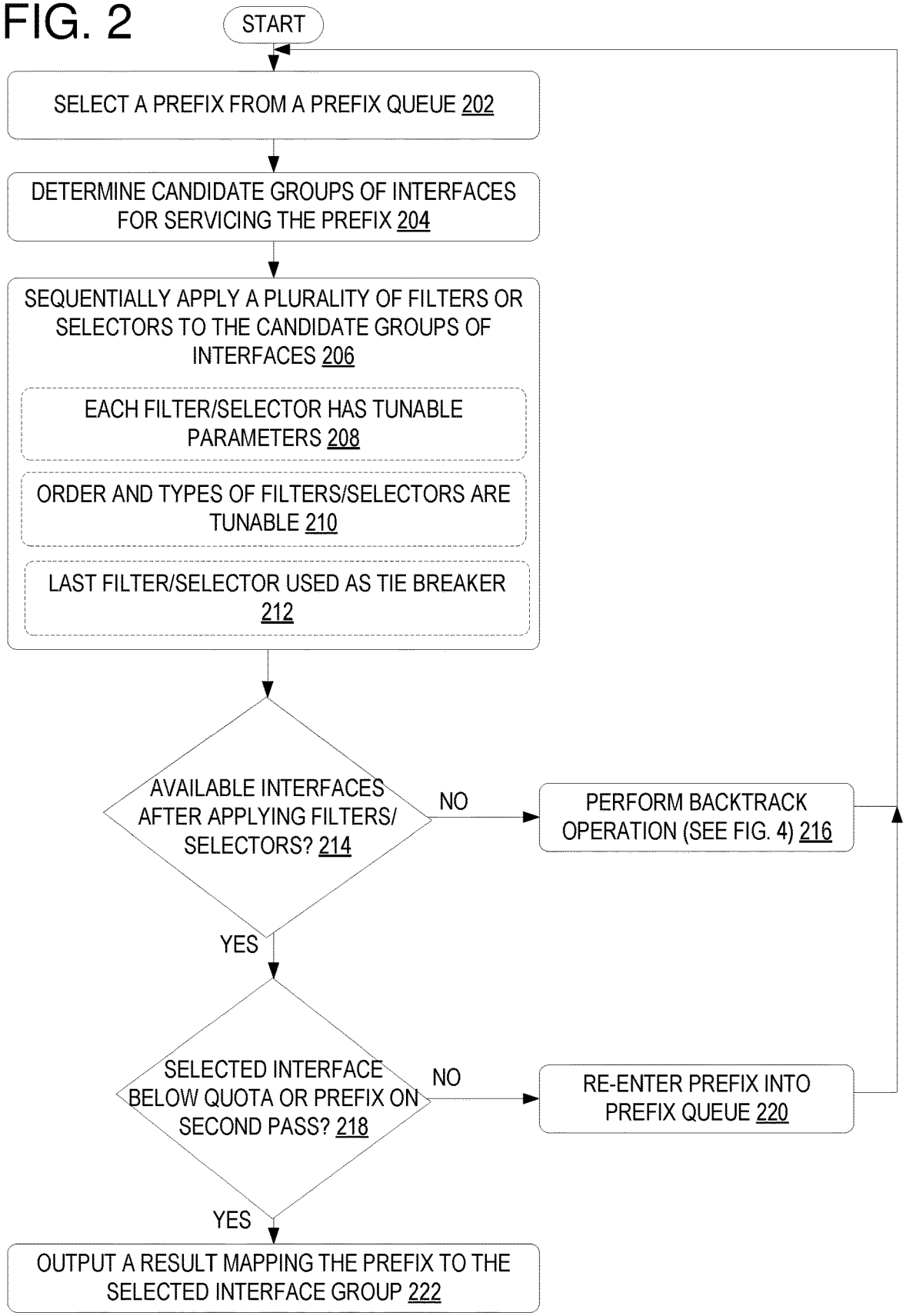
FIG. 2 is a flow chart of an example method for using a series of filters and/or selectors to determine a group of interfaces to be used for routing traffic associated with a prefix through a network.

FIG. 2 is a flow chart of an example method 200 for managing the routing of traffic in a network. For example, method 200 may be performed by a control plane of the network, such as the traffic management control plane 150 of FIG. 1. At 202, the method includes selecting a prefix from a prefix queue. For example, traffic controlled by the traffic management control plane may be associated with respective network address prefixes, which are entered into the prefix queue to sequentially determine allocations of groups of interfaces to service the traffic. In some examples, the prefix queue may be ordered based on an amount of traffic and/or a size of the prefix, or based on other characteristics.

At 204, the method includes determining candidate groups of interfaces for servicing the prefix. For example, the candidate groups of interfaces may represent interfaces that can be used to route traffic (e.g., data packets) corresponding to the prefix through the network (e.g., egress traffic from data centers or other client/customer devices out to the Internet, and/or other traffic, such as ingress traffic into the network).

At 206, the method includes sequentially applying a plurality of filters and/or selectors to the candidate groups of interfaces. For example, the filters and/or selectors may be used to narrow the groups of interfaces based on parameters such as performance information (e.g., latency, packet loss, jitter, throughput, and/or other parameters and/or combinations of parameters), connectivity type (e.g., peer type, such as local/private network interfacing versus interfacing that utilizes a backbone or transit network/devices, which may filter out candidate interface groups based on locality information for the groups), cost, path stability (e.g., prioritizing path selections that maintain previous allocations), service quotas, and/or other parameters. The filters and/or selectors may set respective thresholds used to filter out candidate groups of interfaces based on a parameter for the filter/selector (e.g., removing candidate groups that are above/below a respective threshold for the parameter associated with the filter/selector, such as a latency threshold, packet loss threshold, jitter threshold, throughput threshold, cost threshold, utilization threshold, etc.), use binary logic (e.g., select or remove candidate groups based on whether the groups meet a setting for the filter/selector), use ranking (e.g., select a top n number of candidate groups ranked according to a parameter of the filter/selector), and/or otherwise apply algorithm(s) to the candidate groups of interfaces to reduce the candidate groups to a selected one group of interfaces. As indicated at 208, the parameters of each filter and/or selector may be tunable (e.g., the threshold used, etc.) in order to allow for customization on a per-customer/per-client/per-prefix basis. As further indicated at 210, the order and types of filters and/or selectors may also be tunable. For example, the sequential application of the filters and/or selectors enables selection parameters to be prioritized based on a position in the algorithm (e.g., positioning a performance-based filter prior to a cost filter that selects n candidates having a lowest cost ensures that the n candidates are candidates that meet a performance threshold, whereas positioning the above example filters in the reverse order ensures that the cost is prioritized). As indicated at 212, the last filter/selector applied to the groups of interfaces may, in some examples, include a tie breaker filter/selector configured to select one (or a top n number of groups of interfaces) based on a selected parameter. As a non-limiting example, the last-applied filter/selector may be configured to select a lowest-utilized group of interfaces (or n lowest utilized groups of interfaces) from the groups remaining after applying the other filters/selectors of the plurality referenced at 206.

At 214, the method includes determining if there exist available interfaces after applying one or more of the filters and/or selectors. For example, although illustrated after operation 206, the determination at 214 may occur at any time of the process in other examples (e.g., at a first step when determining candidate groups of interfaces) and/or after selected filters/selectors (e.g., a performance filter, a last filter/selector used as a tie breaker). The operation at 214 may include checking whether the filtering and/or evaluation of interface groups removed all candidate groups of interfaces from consideration (e.g., in a situation where all candidate groups of interfaces offer a performance below a threshold or are above a threshold capacity, the operation at 214 may be triggered, following the "NO" branch, whereas if at least one candidate group of interfaces remains with available capacity to handle traffic associated with the prefix, the operation at 214 follows the "YES" branch). If there are no available interfaces (e.g., "NO" at 212), the method includes performing a backtrack operation, as indicated at 216, in order to attempt to free up resources to service the traffic associated with the prefix. The backtrack operation is described in more detail below with respect to FIG. 4. Briefly, the backtrack operation identifies traffic/prefix(es) that can be re-allocated to use different group(s) of interfaces and enters those prefixes into the prefix queue (subjecting the prefixes to method 200). The group(s) of interfaces used by those identified prefixes (e.g., which may meet the performance threshold or other metric used by the filters for the prefix that triggered the backtrack operation) may then be included in the candidate groups of interfaces for the prefix that triggered the backtrack operation, as the method returns to 202 (e.g., with the prefix that triggered the backtrack operation back in, and selected from, the prefix queue).

If there are available interfaces after applying the filters/selectors (e.g., "YES" at 214), the method includes determining if the selected group(s) of interfaces (e.g., selected at 212 and/or selected after application of the filters at 206) is below a service quota (e.g., a pre-agreed capacity allocation for egress interfaces by a source service) or if the prefix is on a second path through the filters/selectors, as indicated at 218. For example, the service quota may be a per interface per service quota, such that each interface or group of interfaces allots a percentage of its capacity to be used by a given service (e.g., associated with a prefix). In this way, prefixes processed at a beginning of the prefix queue, which may be associated with one or more services, may be prevented from filling a total available capacity of an interface or group of interfaces until prefixes for all other services have a chance to be mapped to the interface or group of interfaces (e.g., the second pass for the prefix may be after the other prefixes have had a chance to be mapped to the interface/group(s) of interfaces). If the selected group(s) of interfaces is not below a service quota and the prefix is not on its second pass (e.g., "NO" at 218), the method includes re-entering the prefix into the prefix queue to perform a second pass through the filters/selectors, as indicated at 220. In some examples, the selected group(s) of interfaces may be removed from the candidate groups of interfaces for the second pass or deprioritized (e.g., selected after the second pass only if no other groups of interfaces are left after applying all of the filters/selectors in the second pass).

If the selected group(s) of interfaces is below the quota or the prefix is on its second pass through the filters/selectors (e.g., "YES" at 218), the method includes outputting a result mapping the prefix to the selected interface group, as indicated at 222. It is to be understood that the operations of method 200 may be performed iteratively for each prefix in the prefix queue, and the result at 222 may include the mappings for each prefix to a respective selected interface group(s). In some examples, the method 200 may be performed for different entities to consume the results of the method. In some examples, the results may be used to analyze the network and perform "what if" scenarios simulating possible changes to the network before such changes are applied. In other examples, which may be performed simultaneously to the simulation example described above in some cases, the results may be provided to one or more network devices in order to alter the network to route traffic in accordance with the results. For example, the result may be provided to an actuator interface, as described above with respect to FIG. 1, that computes what changes/moves are to happen from a previous state of the network to reach an intended state that includes the result of method 200. Such computations may include, in some examples, translating the mapping output at 222 to BGP messages, which are propagated to one or more BGP speakers in order to change forwarding information bases of routers in the network indirectly to cause the traffic associated with the prefix to utilize the selected interface group. In other examples, the computations may include translating the mapping output at 222 to another form of data usable by other steering mechanisms to control the routing of traffic through the network in accordance with the mapping.

Figure 3:
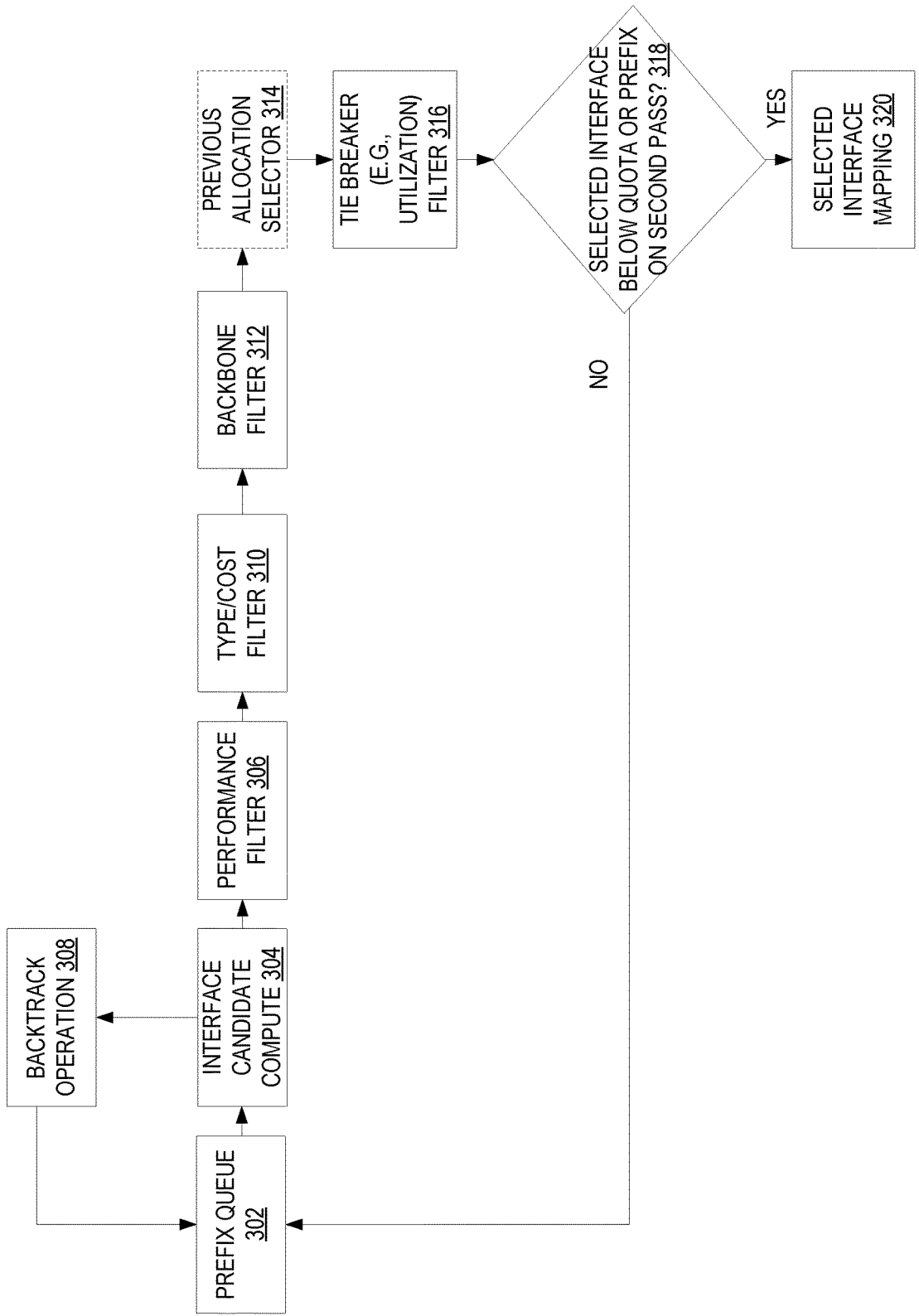
FIG. 3 schematically shows an example series of filters and/or selectors that may be applied to candidate groups of interfaces to determine adjustments to traffic management in a network.

FIG. 3 shows an example route optimization routine 300 including a series of filters and/or selectors that may be applied to candidate groups of interfaces to select a group of interfaces to service traffic associated with a selected networking prefix. For example, routine 300 may be performed by route optimizer 156 of FIG. 1 and/or to perform the interface group mappings described in method 200 of FIG. 2. The routine 300 includes adding prefixes for allocation to a prefix queue 302. One-by-one, each prefix may be passed through a series, or chain, of filters and/or selectors. It is to be understood that the number, order, and type of filters/selectors shown in FIG. 3 are provided for illustrative purposes and may be adjusted on a per-customer, per-traffic-type, and/or other basis.

At 304, an interface candidate compute engine is configured to determine candidate groups of interfaces (e.g., a list of candidate groups of interfaces) available to service traffic for a selected prefix in the queue. In some examples, the candidate groups of interfaces may include groups of interfaces that are not already experiencing traffic congestion (e.g., degraded performance due to traffic, traffic greater than a threshold, etc.). As indicated at 308, if the compute engine at 304 determines that no candidate groups of interfaces are available (e.g., if all of the candidate groups in the list provide below the threshold level of performance), a backtrack operation 308 may be performed (described in more detail below with respect to FIG. 4) to re-allocate traffic that is already mapped to other groups of interfaces in order to expand the candidates available for the current prefix. As described above, in some examples, the backtrack operation at 308 may be triggered in additional or alternative conditions/timings, such as when detecting that too much traffic is being moved over a backbone network, when detecting that other filters/selectors remove a last remaining candidate group(s) of interfaces, etc.

If the interface candidate compute engine is able to identify candidate groups of interfaces that are available to service traffic for the prefix, the candidate groups in the list may be provided to the chain of filters/selectors to determine one or more groups of interfaces to be mapped to the prefix. An example first filter includes a performance filter 306, which may be applied to the list of candidate groups to filter out groups that do not meet a performance threshold (e.g., groups that provide below a threshold level of performance). As described above, performance may be measured for any suitable parameter or combination of parameters, including latency, throughput, jitter, etc. In some examples, the performance filter may additional or alternatively reduce the candidate groups by ordering the groups by performance and selecting a top n (where n is an integer number that may be defined by a client/customer and/or a default value) performing groups and/or groups having substantially the same/highest performance rating (e.g., groups performing within a tolerance level of a highest performing group—such as groups that provide a path having a latency within x milliseconds of a lowest latency path, where x is a value set by the client/customer and/or a default value).

A type/cost filter 310 may be applied to the list of candidate groups to remove, from the remaining candidate groups after applying the performance filter (e.g., a reduced list or set of candidate groups of interfaces), groups that have a cost to use (or cost above a threshold cost) and/or to preferentially select, from the remaining candidate groups, groups having no cost (or less than a threshold cost) to use. The type/cost filter 310 may additionally or alternatively be used to remove and/or preferentially select, from the remaining candidate groups, groups of a selected peer type.

At 312, a backbone filter is applied to filter out, from the candidates remaining after application of the performance and type/cost filters, those groups of interfaces that include network devices that utilize a backbone network and/or to preferentially select, from the candidates remaining after application of the performance and type/cost filters, groups of interfaces that are within a threshold distance (e.g., number of hops, within a local network, etc.) of one another/a selected source network device. A previous allocation selector 314 may optionally be used in some contexts to preferentially select, if remaining after application of the filters 306-312, a group (or groups) of interfaces that was previously allocated for the prefix. If the previous allocation is not used and/or if the previously-allocated group is not remaining in the filtered candidates, a tie breaker filter 316 (such as a utilization filter) may be applied to the groups remaining as candidates after application of the filters 306-312 to select a group(s) of interfaces meeting a selected tie breaker parameter (e.g., having a lowest current utilization). For example, each filter/selector may generate an iteratively further reduced list of candidate groups of interfaces, and the tie breaker filter may be used to select a targeted one or more groups of interfaces from the last-generated reduced list of candidate groups of interfaces to be mapped to the prefix.

The selected group(s) of interfaces is checked to determine if the group is below a service quota for the interfaces (e.g., a pre-agreed capacity allocation), as indicated at 318. If the selected group(s) of interfaces is not below the quota and if the prefix is not on a second pass through the routine (e.g., "NO" at 318), the prefix is added back to the prefix queue to make a second pass (e.g., after processing the other prefixes in the queue through the chain of filters/selectors) in an attempt to identify a next best group of interfaces that still passes the filters and/or selectors. If the selected group(s) of interface is below the quota and/or if the prefix is on a second pass through the routine (e.g., "YES" at 318), the select group(s) of interfaces is mapped to the prefix, as indicated at 320. The routine may be performed periodically (e.g., once every ten minutes as a non-limiting example) in some examples, in which case a second pass may be defined as a second pass during a given period of performing the routine. In other examples, the routine may be performed continuously and/or responsive to a trigger such as a received request from an administrator of the network and/or a detection of a triggering event (e.g., a network issue, such as a threshold increase in dropped traffic, etc.).

Figure 4:
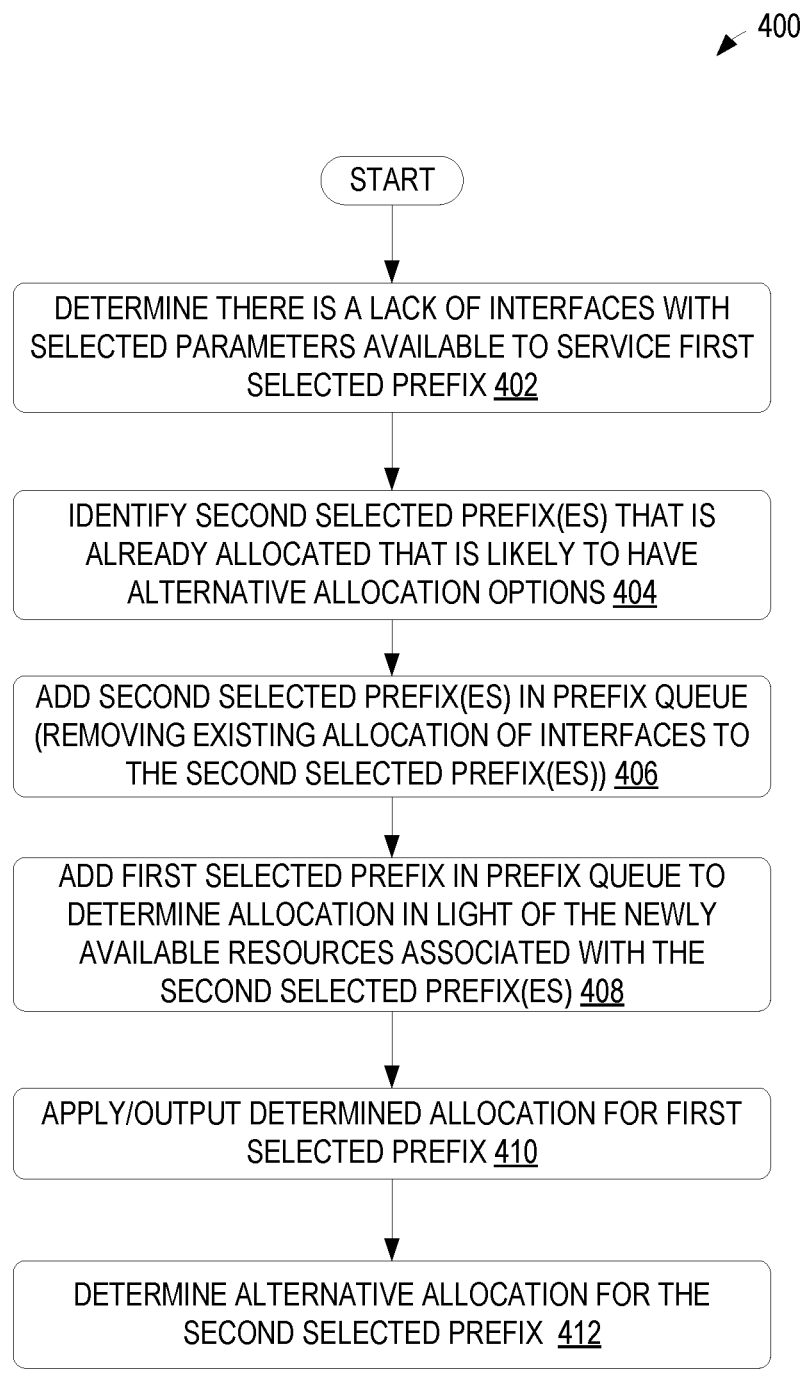
FIG. 4 is a flow chart of an example method for performing a backtrack operation to re-allocate groups of interfaces for traffic management.

FIG. 4 is a flow chart of an example method 400 for performing a backtracking operation to free up allocated groups of interfaces to service traffic for prefixes. For example, method 400 (or a portion thereof) may be performed by a traffic management system (e.g., traffic management control plane 150 of FIG. 1) responsive to a determination that there are no available candidate groups of interfaces after performing an initial computation of candidate groups of interfaces for the prefix and/or after applying one or more filters and/or selectors as described above with respect to FIGS. 2 and 3 (e.g., at 216 of FIG. 2 and at 308 of FIG. 3). At 402, the method includes determining that there is a lack of interfaces/groups of interfaces with selected parameters available to service first selected prefix (e.g., traffic associated with the first selected prefix).

At 404, the method includes identifying second selected prefix(es) (e.g., traffic associated with the second selected prefix(es)) that is already allocated/mapped to group(s) of interfaces, and that is likely to have alternative allocation options. For example, the second selected prefix(es) may be selected based on a number and/or type (e.g., parameters) of filters and/or selectors to be applied to the second selected prefix(es).

At 406, the method includes adding the second selected prefix(es) in a prefix queue (e.g., to a front of the queue) to determine an alternative allocation for the second selected prefix(es). For example, adding the second selected prefix(es) in the prefix queue may also include de-allocating the associated group(s) of interfaces for the second selected prefix(es) so that the associated group(s) of interfaces are made available to be allocated to other prefixes.

At 408, the method includes adding the first selected prefix to the prefix queue to determine an allocation in light of the de-allocation of interfaces for the second selected prefix(es) (e.g., the newly available resources, made available as a result of the de-allocation). For example, the first selected prefix may be positioned in the prefix queue ahead of the second selected prefix(es) (which may be positioned ahead of other prefixes in the queue so as to be processed next after the first selected prefix is mapped to a group(s) of interfaces). As used herein, the de-allocation for the second selected prefix(es) may be in reference to the allocation of resources as a result of processing the prefix queue for generation of a map (e.g., an egress map) as described above. For example, the traffic associated with the second selected prefix(es) may not be re-routed or de-allocated within the network until the prefix queue has been emptied (e.g., until all prefixes in the prefix queue have been associated with groups of interfaces and a mapping has been output), in some examples. In other examples, the de-allocation may be propagated to the network substantially upon re-entry of the second selected prefix(es) into the prefix queue and/or at other timings, such as in examples where the map is generated for continuous updates (e.g., where mappings are propagated to the network for rerouting traffic on the network after each prefix in the prefix queue is processed and/or at regular intervals).

At 410, the method includes applying and/or outputting the determined allocation for the first selected prefix. For example, the first selected prefix may be mapped to a group of interfaces that was previously mapped to (e.g., one or more of) the second selected prefix(es). The mapping may be output to one or more service and/or network devices in order to adjust traffic on the network accordingly, for example as described above with respect to operation 222 of FIG. 2.

At 412, the method includes determining an alternative allocation for the second selected prefix(es) (e.g., processing the second selected prefix(es) though the chain of filters). For example, a different group of interfaces may be selected to service the second selected prefix(es) (e.g., traffic associated with the second selected prefix(es)). It is to be understood that the determination of alternative allocation (e.g., re-allocation) described above may be performed for multiple prefixes to free up more bandwidth on groups of interfaces and/or to provide additional options for candidate groups of interfaces for the first selected prefix.

Figure 5:
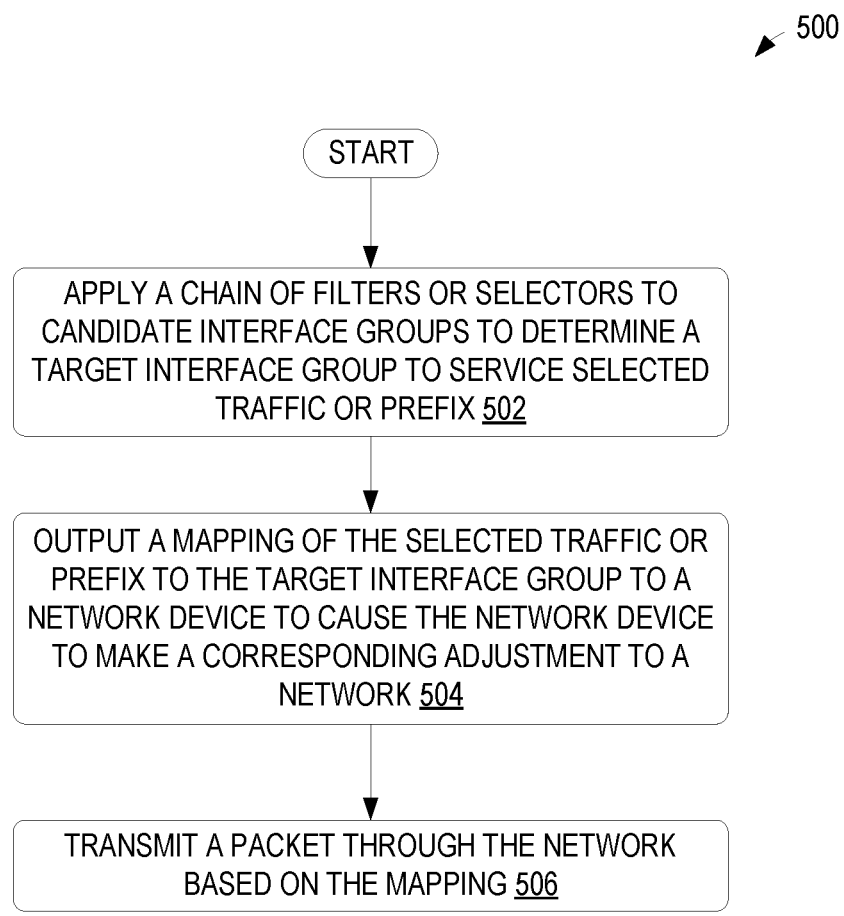
FIG. 5 is a flow chart of an example method for managing traffic in a network based on application of multiple filters and/or selectors to candidate groups of interfaces for servicing traffic associated with a selected prefix.

FIG. 5 is a flow chart of an example method 500 for managing traffic in a network in a context-aware manner based on application of multiple filters. For example, method 500 may be performed by a traffic management service, such as traffic management control plane 150 of FIG. 1. At 502, the method includes applying a chain of filters and/or selectors to candidate interface groups to determine a target interface group to service selected traffic or a selected prefix associated with the selected traffic. For example, the chain of filters and/or selectors may include algorithms to reduce the candidate interface groups as described above in more detail with respect to FIGS. 2 and 3.

At 504, the method includes outputting a mapping of the selected traffic or prefix to the target interface group to a network device to cause the network device to make a corresponding adjustment to a network. For example, as described above at 222 of FIG. 2, the output mapping may be supplied to one or more BGP speakers to control associated routers to route the selected traffic or traffic associated with the selected prefix using the target interface group. At 506, the method includes transmitting a packet through the network based on the mapping. In this way, the network may be adjusted to handle the traffic in accordance with parameters configured for the traffic and reflected in the filters and/or selectors.

Figure 6:
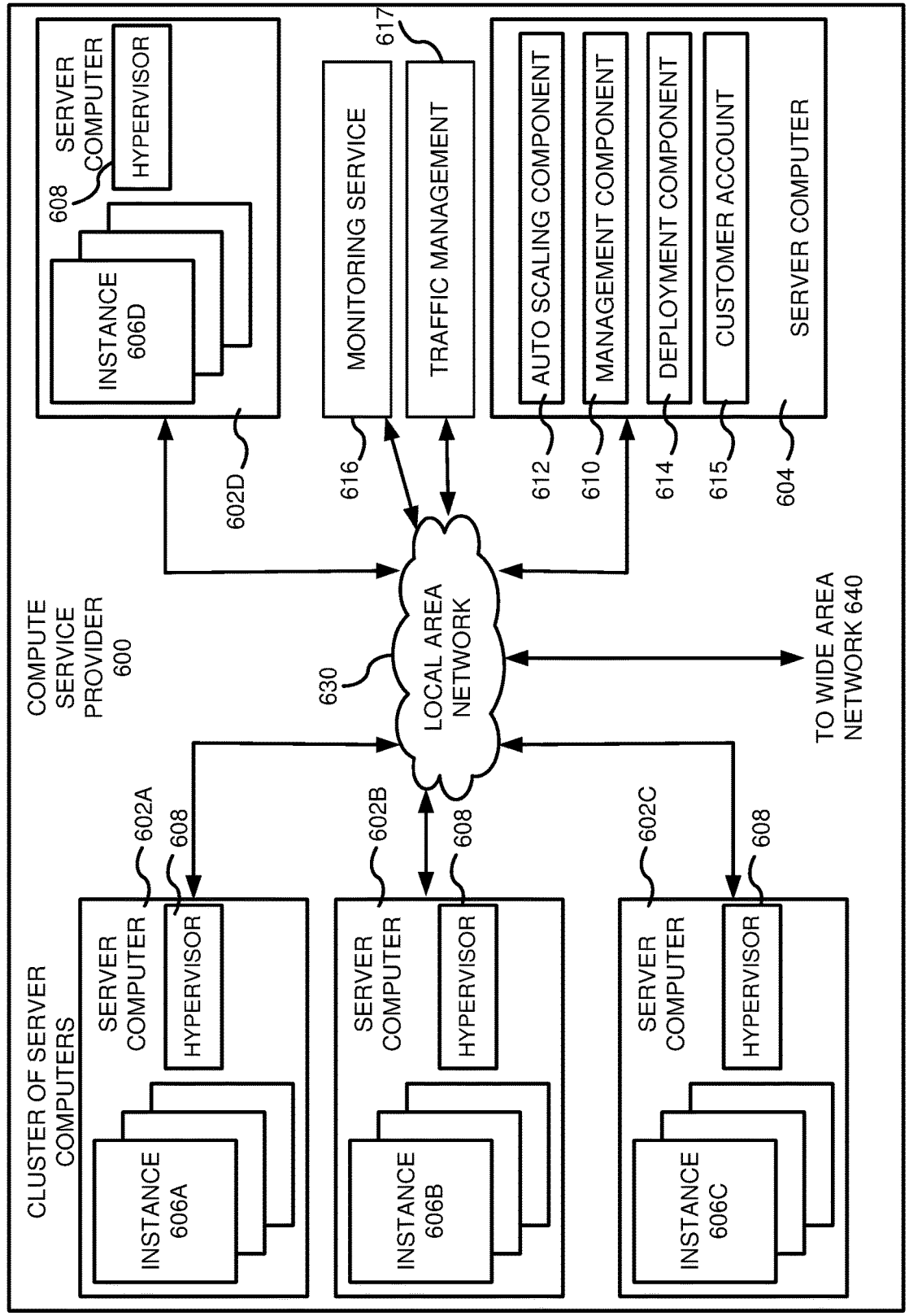
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. For example, the compute service provider 600 may be coupled to and/or include the network devices of FIG. 1 and/or the traffic management control plane 150 of FIG. 1 as described above. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of users operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A user can access the management component 610 to configure various aspects of the operation of the instances 606 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 612 can scale the instances 606 based upon rules defined by the user. In one embodiment, the auto scaling component 612 allows a user to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist users in the deployment of new instances 606 of computing resources. The deployment component can have access to account information associated with the instances, such as who is the owner of the account, credit card information, country of the owner, etc. The deployment component 614 can receive a configuration from a user that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the user-provided configuration and cache logic to configure, prime, and launch new instances 606. The configuration, cache logic, and other information may be specified by a user using the management component 610 or by providing this information directly to the deployment component 614. The instance manager can be considered part of the deployment component.

User account information 615 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc. A monitoring service 616 may be in communication with one or more components of devices in the multi-tenant environment. For example, monitoring service 616 may be an example of network monitoring service 154 of FIG. 1, and may be configured to monitor and generate telemetry data relating to network status/operations, as described above with respect to FIG. 1. A traffic management service 617 may utilize data from the monitoring service 616 to perform context-aware routing of traffic using a series of filters and/or selectors, as described above with respect to FIGS. 1-5. For example, traffic management service 617 may be an example of traffic management control plane 150 of FIG. 1 and/or may apply the series of filters and/or selectors described in FIG. 3.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
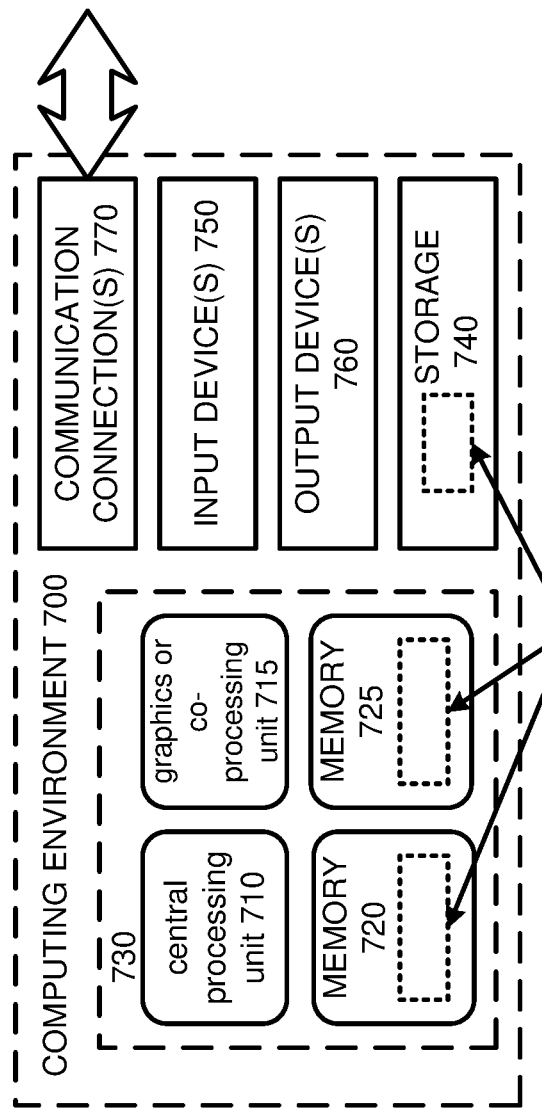
FIG. 7 depicts a generalized example of a suitable computing environment in which the described innovations may be implemented.

FIG. 7 depicts a generalized example of a suitable computing environment 700 in which the described innovations may be implemented. For example, network devices of FIG. 1 and/or the network monitoring control plane 150 and network monitoring service 154 of FIG. 1 may include or be included in respective device(s) comprising one or more of the components of computing environment 700. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. For example, one or more of the operations of methods 200, 400, and/or 500 of FIGS. 2, 4, and 5, respectively, may be performed by a processing unit such as processing units 710, 715. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of managing traffic routing for a border network used to communicate between autonomous systems, the method comprising:
receiving, at a traffic management control plane, telemetry data for multiple routers in the border network;
selecting a first network address prefix from a prefix queue of the traffic management control plane;
determining a list of candidate groups of interfaces in the border network available to service traffic associated with the selected first network address prefix;
sequentially applying a set of filters or selectors to the list of candidate groups of interfaces in an order that is based on a respective priority of one or more parameters associated with each filter or selector in the set of filters or selectors, the set of filters including a performance filter configured to filter the list of candidate groups of interfaces based on performance information for the candidate groups of interfaces of the list of candidate groups of interfaces, wherein, responsive to determining that all groups from the list of candidate groups of interfaces are filtered out by the performance filter, performing a backtrack operation that includes identifying a second network address prefix that is already mapped to a respective group of interfaces in the border network, adding the second network address prefix to the prefix queue and applying the set of filters or selectors to determine an alternative re-allocation for traffic associated with the second network address prefix, and re-applying the set of filters or selectors to the first network address prefix after the traffic associated with the second network address prefix is re-allocated;
selecting a targeted group of interfaces from groups of interfaces that remain after applying the set of filters or selectors to the list of candidate groups of interfaces, the targeted group of interfaces being selected based on a utilization of the targeted group of interfaces;
outputting, to an actuator interface of the traffic management control plane, an egress map including a mapping of the targeted group of interfaces to the selected first network address prefix; and
outputting, from the actuator interface to one or more network devices, messages configured to alter traffic routing in the border network based on the egress map.

2. The method of claim 1, wherein the one or more network devices comprise Border Gateway Protocol (BGP) speakers configured to use the messages to update routing information in the multiple routers of the border network to allocate traffic associated with the selected first network address prefix to the targeted group of interfaces.

3. The method of claim 1, wherein the set of filters or selectors further includes a peer type filter, a cost filter, a backbone filter, or a previous allocation selector.

4. The method of claim 1, further comprising, responsive to determining that the targeted group of interfaces is above a traffic service quota, adding the selected first network address prefix back to the prefix queue to perform a second pass through the set of filters or selectors for the selected first network address prefix.

5. The method of claim 1, wherein adding the second network address prefix to the prefix queue includes de-allocating the respective group of interfaces for the second network address prefix so that the respective group of interfaces is made available to be allocated to other network address prefixes.

6. A method comprising:
receiving, at a traffic management control plane, telemetry data for multiple routers in a network;
selecting a first network address prefix from a prefix queue of the traffic management control plane;
applying a chain of filters or selectors to candidate interface groups for the network to determine at least one target interface group of the candidate interface groups to service traffic corresponding to the selected first network address prefix, the filters in the chain of filters or selectors being applied sequentially in an order based on respective priorities of one or more parameters associated with the filters or selectors of the chain of filters or selectors, wherein, responsive to determining that all interface groups from the candidate interface groups are filtered out by the chain of filters or selectors, performing a backtrack operation that includes identifying a second network address prefix that is already mapped to a respective group of interfaces in the network, adding the second network address prefix to the prefix queue and applying the chain of filters or selectors to determine an alternative allocation for traffic associated with the second network address prefix and re-applying the chain of filters or selectors to the selected first network address prefix after the traffic associated with the second network address prefix is re-allocated;
outputting a mapping of the selected first network address prefix to the at least one target interface group to a network device of the network to cause the network device to make a corresponding adjustment to the network; and
transmitting a packet through the network based on the mapping.

7. The method of claim 6, wherein the chain of filters or selectors includes a performance filter configured to filter out a subset of the candidate interface groups based on a performance threshold to generate a reduced candidate interface group.

8. The method of claim 7, wherein the performance threshold includes one or more of a latency threshold, a jitter threshold, or a throughput threshold.

9. The method of claim 7, wherein the chain of filters or selectors further includes at least one of a peer type filter configured to filter out a subset of the reduced candidate interface group based on a targeted peer type, a cost filter configured to filter out a subset of the reduced candidate interface group based on a cost threshold, or a backbone filter configured to filter out a subset of the reduced candidate interface group based on a locality of interfaces in the reduced candidate interface group, and wherein application of the at least one of the peer type filter, the cost filter, or the backbone filter generates a further reduced candidate interface group.

10. The method of claim 9, wherein the chain of filters or selectors further includes a previous allocation selector configured to set the at least one target interface group to a selected interface group that was previously allocated to the selected first network address prefix when the selected interface group is present in the further reduced candidate interface group.

11. The method of claim 9, wherein the chain of filters or selectors further includes a utilization filter configured to set the at least one target interface group to a lowest-utilized interface group in the further reduced candidate interface group.

12. The method of claim 11, further comprising traversing the chain of filters or selectors in a second pass for the selected first network prefix if the target interface group is above a service quota.

13. The method of claim 6, wherein the network includes a border network that allows a cloud provider autonomous system (AS) to connect with another AS.

14. A system, comprising:
   a network including a plurality of routers having different interfaces coupled to one another or to third-party routers, wherein the interfaces are grouped to form paths through the network, each of a plurality of groups of interfaces having respective network parameters for transmitting network packets to the Internet; and
   a controller comprising a storage device storing instructions executable by a processor of the system to generate a mapping of the plurality of groups of interfaces to network address prefixes to control a forwarding of packets through the network based on the respective network parameters, wherein the mapping is generated by applying a chain of filters or selectors to the plurality of groups of interfaces sequentially in an order based on respective priorities of respective selection parameters of each filter or selector in the chain of filters or selectors to determine a target group of interfaces to service traffic corresponding to a selected first network address prefix, wherein, responsive to determining that all groups of interfaces in the plurality of groups of interfaces are filtered out by the chain of filters or selectors, performing a backtrack operation that includes identifying a second network address prefix that is already mapped to a respective group of interfaces in the network, adding the second network address prefix to a prefix queue and applying the chain of filters or selectors to determine an alternative allocation for traffic associated with the second network address prefix, and re-applying the chain of filters or selectors to the selected first network address prefix after the traffic associated with the second prefix is re-allocated.

15. The system of claim 14, wherein the chain of filters or selectors include filters for two or more of performance characteristics, peering types, cost, locality, and utilization characteristics of the groups of interfaces.

16. The system of claim 15, wherein the peering types include a Private Network Interconnect (PNI), an Internet Exchange, or a transit provider.

17. The system of claim 15, wherein the filter for utilization characteristics is a last-applied filter configured to select the target group of interfaces for allocation for the selected first network address prefix to be a lowest-utilized group of interfaces that remains after application of the other filters or selectors in the chain of filters or selectors.

18. The system of claim 14, wherein the controller is under control of a cloud provider.

19. The system of claim 14, wherein the network includes a border network that is within a first Autonomous System (AS) and that is coupled to a second AS.

* * * * *